United States Patent [19]
Schumacher

[11] 3,934,081
[45] Jan. 20, 1976

[54] METHOD AND APPARATUS FOR IMPROVING PHOTOMECHANICAL REPRODUCTION BY CONTRAST DECREASE

[76] Inventor: Ernst E. Schumacher, Gruneburgweg 129, 6 Frankfurt am Main, Germany

[22] Filed: Apr. 1, 1974

[21] Appl. No.: 456,605

[30] Foreign Application Priority Data
Mar. 31, 1973  Germany............................ 2316273

[52] U.S. Cl............ 178/6.8; 178/DIG. 1; 178/6.7 R; 355/20; 355/43
[51] Int. Cl.²........................................... H04N 7/18
[58] Field of Search............ 358/37, 76, 80; 355/20, 355/67, 68, 69, 70, 71, 77, 43; 178/DIG. 16, DIG. 1, 6, 6.8, 6.7 R, 6.6 R

[56] References Cited
UNITED STATES PATENTS

| | | | |
|---|---|---|---|
| 2,988,978 | 6/1961 | Craig | 355/70 |
| 3,297,822 | 1/1967 | Braid | 178/7.88 |
| 3,340,360 | 9/1967 | Celio | 178/6.8 |
| 3,415,951 | 12/1968 | Heller | 178/7.88 |
| 3,480,365 | 11/1969 | Oove | 355/77 |
| 3,576,945 | 5/1971 | Ebeling | 178/6.8 |
| 3,646,262 | 2/1972 | Moe | 178/6.7 R |
| 3,673,933 | 7/1972 | Hamann | 355/43 |
| 3,715,619 | 2/1973 | Cotter | 178/6.8 |
| 3,746,782 | 7/1973 | Driskell | 178/6.8 |
| 3,758,707 | 9/1973 | Keller | 358/80 |

OTHER PUBLICATIONS
*Printing Color Negatives* pp. 47–48, 1969, Eastman Kodak Company.

*Primary Examiner*—Howard W. Britton
*Assistant Examiner*—Michael A. Masinick
*Attorney, Agent, or Firm*—Rummler & Snow

[57] ABSTRACT

A method and apparatus for reproducing black and white and color copy having improved contrast of highlight and shadow areas of the copy by recording an optically-produced main image on a light-sensitive emulsion, directing the light emanating therefrom via television camera and electronically inverting the same and sending this signal through a video monitor having contrast and brightness control, and projecting the secondary negative image therefrom onto the light-sensitive emulsion in register with the main positive image.

7 Claims, 1 Drawing Figure

U.S. Patent  Jan. 20, 1976  3,934,081
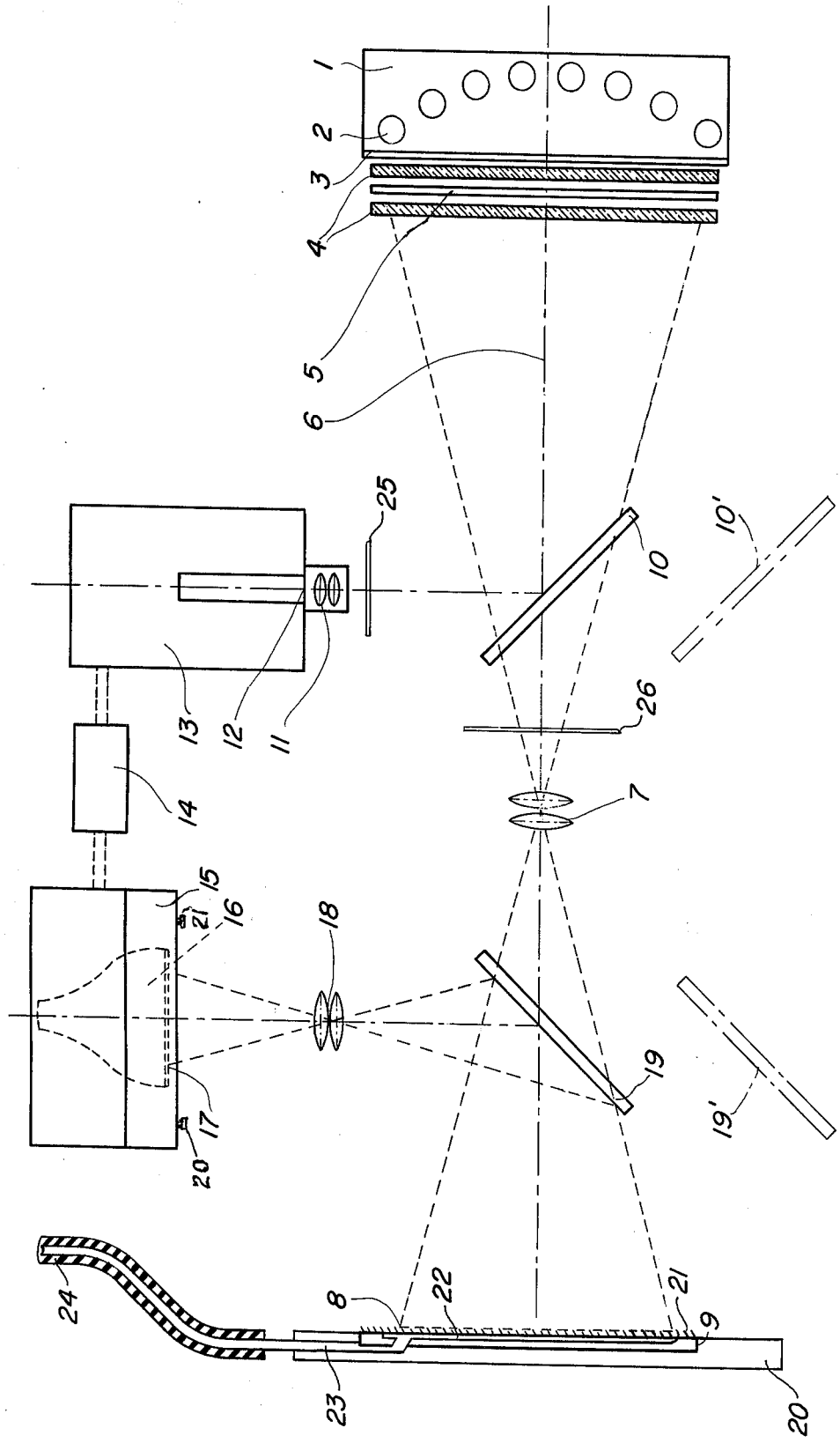

METHOD AND APPARATUS FOR IMPROVING PHOTOMECHANICAL REPRODUCTION BY CONTRAST DECREASE

BACKGROUND OF THE INVENTION

In continuous tone and halftone reproduction or enlargements, it is hardly ever possible to reproduce the entire tonal range of the copy on the printed sheet. Even high speed emulsions or the combination of such emulsions with a halftone screen which records a long density range cannot prevent the loss of some of the tones of the original. It is common practice to overcome these difficulties by giving an "auxiliary exposure". Process cameras and enlargers are equipped with so-called "auxiliary exposure devices" which can be tilted in front of the lens (on the side of the original).

This kind of exposure has the disadvantage that it flattens the overall contrast of the image. While it affects the highlights and bright areas of the image very little, the effect becomes more and more pronounced with a density increase in the shadow area. The result is a loss of detail in the shadows and a grey appearance of the 75 percent tones.

It must therefore be the aim of a satisfactory reproduction to confine the flattening effect of the exposure to the middle tones and to leave the contrast in the highlights and shadows unaffected. In color work, this aim is reached by making one or several color correction masks prior to the color separation. The mask negatives have an S-shaped characteristic curve. Highlights and shadows of the mask are flat so that the copy contrast in these areas remains materially unaffected. The steeper slope of the characteristic curve in the middle tones decreases the copy contrast in these areas.

Masking methods are generally applied in color work. They would, however, be much too expensive and too time-consuming for improving black and white reproductions.

It is therefore the purpose of this invention to propose a process and means for improving the quality of both black and white and color work by recording a satisfactory tonal scale without the use of masking methods. A "satisfactory" tone scale records the full contrast of the highlight and shadow areas of the copy, while the contrast of the brighter and darker middle tones is decreased, the amount of decrease depending on the limitations inherent in the printing process applied.

The gist of this invention lies in a method and an apparatus for projecting one and the same copy, for instance color transparency, onto one and the same imaging plane where they are both photographically recorded, either simultaneously or consecutively, in black and white or in color. Two different transmission systems are used for this operation; viz., a first process lens on a first optical axis for direct recording of the main image therefrom, on the one hand, and a short focal length lens of a black and white television camera on a second optical axis for recording a negative secondary image thereon, on the other hand. After going from the television camera lens through a photo-cathode in the television camera, the secondary image is sent through an amplifier and a negative-converter to a plane telescreen located in the picture tube of a video-monitor having optoelectronic contrast and brightness control and on through a second process lens for projecting and superimposing said negative secondary image on the main positive image thereof.

Summary of the Invention

In accordance with this invention, there is proposed a method for optically projecting the primary image of a copy onto the camera ground glass or for recording it on the light sensitive emulsion (film) and for superimposing thereon, at the same time or after the exposure of the primary image, a secondary negative image. The characteristics of this secondary image are those of a negative mask, viz. flat highlights, somewhat contrastier middle tones and very flat shadows. Said method includes the following steps for producing the additional image. Prior to, during or after the main exposure, a reversing mirror directs the light emanating from the copy to the lens of a black and white television camera; the resulting negative video signal is sent to a monitor having contrast optoelectronic contrast and brightness control whose picture tube comprises a plane telescreen; the picture reproduced on this screen is superimposed on the main image via a projection lens and a second reversing mirror. The specific adjustment of mirrors and reproduction systems ensures a perfect coincidence in size and location of the main and the additional image. The contrast and brightness control gives tonal scale adjustment of the image that results in improved photo reproduction.

With regard to the arrangement of the reversing mirrors, two versions are proposed. The mirrors can be either partially transmitting, so-called non-selective beam splitters or they can be totally reflecting. In the former case, the superposition of the video channel produced negative image takes place simultaneously with the projection of the main image so that a real time visual appraisal of the cumulative effect is possible.

In the latter case, i.e. with the use of totally reflecting mirrors, a mechanism is provided to move the mirrors out of the way for the optical-photographic reproduction and to reinsert them into the path of rays for producing the additional negative image. In this case, the direct optical reproduction via the process lens is interrupted.

The S-shaped characteristic curve of the additional image, produced via video channel, is attained without difficulty. To flatten the tonal scale in the highlights, all that is required is to limit the intensity of signalling the highlights of the copy by manipulating the contrast control on the video monitor. A moderate effect of the additional image in the shadows is simply achieved by decreasing the brightness of the image on the monitor. The relatively shallow characteristic curve in the entire middle tone range can also be easily obtained with standard television camera circuitry.

The brightness of the composite image can also be adjusted in various optomechanical ways.

If the brightness of the telescreen image remains constant, the use of neutral density filters enables the brightness of the projected image to be reduced. Another means of brightness adaptation of the additional image is to close the projection lens aperture.

In reproducing color copy, filters are interposed on both first and second optical axes for direct optical projection and TV recording. If the positive and negative video-images of the copy are separately and consecutively recorded, the filters can be placed between the light box and the color transparency sandwiched between supporting glass plates.

It is also possible to balance the effect of the additional image on the main image by fitting the projection lens with a shutter which closes after an empirically determined lapse of time.

BRIEF DESCRIPTION OF THE DRAWING

The drawing shows a schematic diagram of one version of the invention having partially-transmitting mirrors; a second version being indicated by the phantom line showing of a pair of totally-reflecting mirrors which can be substituted for the partially-transmitting mirrors of the main view for certain uses of the invention.

DESCRIPTION OF THE PREFERRED EMBODIMENTS

The preferred embodiment of the proposed equipment for reproducing black and white copy will appear from the following specific description and the drawing, in which element 1 is a light box with a given number of fluorescent tubes or halogen lamps 2. A light-diffusing screen 3 (for instance opal glass) forms the front of the light box 1. Sandwiched between two glass plates 4 is a transparent copy, e.g. a continuous tone transparency 5.

The main imaging path of rays in the optical axis 6 of the process lens 7 strikes the light-sensitive emulsion 8 in the image plane 9 of lens 7, the carrier of said light-sensitive emulsion 8 being held in place on an adhesion or suction ground glass plate 20 having matted surface 21 on which a plurality of parallel surface channels 22 are cut which are in fluid communication with a vacuum channel 23 which connects with a vacuum pump (not shown) through a rubber hose 24.

Two partially-transmitting mirrors or non-selective beam splitters are interposed at an angle of for instance 45° in the main path of rays. Mirror 10 on the copy side directs the light emitted by the light source 1 and passing through the copy 5 to the lens 11 of the television camera 13. Lens 11 can have a fixed focal length or it can be arranged as a vario-lens to simplify setting and adjusting procedures.

In the image plane of this lens 11 is the television pickup 12, for instance in the form of a vidicon.

The television camera 13 is a commercial mono-bloc camera. The image inversion element positive-negative 14 — an essential part of the equipment — is shown for the sake of clarity outside the camera, although it is normally built into it. The video-monitor 15 comprises a picture tube 16 with a plane telescreen 17, a contrast control means 20' (not shown) having a selection knob 20 and a brightness control means 21' (not shown) having a selection knob 21 both being mounted on the front panel thereof. The image is directed via the projection lens 18 and reversing mirror 19 to the image plane 9 of process lens 7 where it is perpendicularly superimposed on the main image in such a way that the detail of both images perfectly coincide.

In another adaptation of my invention, totally-reflecting mirrors 10' and 19' are substituted for the partially-transmitting mirrors 10 and 19. In that case, the mirrors 10' and 19' are moved out of the way off the optical axis 6 for primary exposure before projection of the secondary system image. A mechanical means 22 (not shown) moves the mirrors 10' and 19' off the optical axis 6 for primary image exposure and reinserts the same for projection of the desired tonal scale adjustment image via the television circuit.

In simultaneously reproducing color copy, a filter 26 is required for direct projection along the first optical axis and a filter 25 is required for projection along the second optical axis for TV recording. Filter 26 is located on the first optical axis between the process lens 7 and the partially-transmitting mirror 10. Filter 25 is located on the second optical axis between the partially-transmitted mirror 10 and the lens 11 in the black and white television camera 13. If the pictures are separately and consecutively recorded, the filters 25 or 26 can be placed between the light box 1 and the color transparency 5 sandwiched between glass plates 3 and 4.

Although but two embodiments of this invention have been herein shown and described, it will be understood that details of the apparatus shown may be altered or omitted without departing from the spirit of the invention as defined by the following claims.

I claim:

1. A method for reproducing black and white transparent copy and improving photomechanical reproduction thereof by contrast decrease comprising the steps:
   a. Optically directing the projection of a main positive video image of the transparent copy along a first optical axis through a first process lens onto a first video-imaging plane,
   b. Photographically recording said main positive video-image on a light-sensitive emulsion placed on said first video-imaging plane,
   c. Optically directing the projection of a secondary positive video-image along a second optical axis onto the second imaging plane of a television camera lens,
   d. Converting the secondary positive video-image therefrom on the photo-cathode of the picture tube in said TV camera to an electronic signal,
   e. Electronically amplifying said electronic signal output from the TV camera in an amplifier,
   f. Electronically inverting the amplified electronic signal from the amplifier so received to a negative electronic signal on an electronic signal image inverter,
   g. Converting the negative electronic signal output from the electronic image inverter to a secondary negative video-image on the plane telescreen of the picture tube of a television monitor having opto-electronic image contrast and brightness control,
   h. Optically directing the projection of the secondary negative video-image so contrasted and brightened through a second process lens onto the first video imaging plane in register with the main positive video-image thereon, and
   i. Photographically recording said negative and positive video-images in mutually reciprocal registry on said light-sensitive emulsion.

2. A method as set forth in claim 1 for reproducing transparent color copy and for improving photomechanical color reproduction by contrast decrease including the steps of interposing one or more color filters on the first optical axis before the optical projection of the secondary positive video-image therefrom, or on both the first and second optical axes after the optical projection of the secondary positive video-image from the first optical axis but before the optical projection of the main positive video-image onto the first imaging plane and before the optical projection of the secondary positive video-image on the second imaging plane of the lens of the TV camera.

3. An apparatus for reproducing transparent copy and improving photomechanical reproduction by contrast decrease comprising:
   a. A light-box having optical cooperation with a diffusing screen on one side thereof and a first optical axis extending therethrough in perpendicular relation therewith
   b. a copy plane lying on said first optical axis in perpendicular relation thereto having optical cooperating with light emanating from said diffusing screen,
   c. A means for supporting the transparent copy in optical cooperation with the light diffusing screen lying on said first optical axis,
   d. A first reflecting or refracting means having one optical axis lying on said first optical axis in optical cooperation with the transparent copy and having a second optical axis intersecting said first optical axis,
   e. A first process lens lying on said first optical axis in optical cooperation with the first reflecting or refracting means,
   f. A TV camera lens lying on said second optical axis in optical cooperation with the first reflecting or refracting means,
   g. A TV picture tube lying on said second optical axis in optical cooperation with the TV camera lens and having an electronic signal output,
   h. An electronic signal amplifier operationally connected to the electronic signal output of the TV picture tube,
   i. An electronic signal image inversion means operationally connected to the output from the picture signal amplifier,
   j. A TV monitor having a picture tube with opto-electronic image contrast and brightness control operationally connected to the output of the electronic signal image inversion means,
   k. A plane telescreen operationally connected to the output of the picture tube of the TV monitor and having a third optical axis extending therethrough and intersecting said first optical axis,
   l. A second process lens lying on said third optical axis in optical cooperation with the secondary negative video-image on said plane telescreen,
   m. A second reflecting or refracting means having one optical axis lying on said third optical axis and its other optical axis lying on said first optical axis,
   n. An image plane lying on said first optical axis in perpendicular relation thereto having optical cooperation with light emanating from said first and second process lenses, and
   o. A means for supporting a light sensitive emulsion on said image plane.

4. An apparatus for reproducing transparent copy and improving photomechanical reproduction by contrast decrease, as set forth in claim 3, wherein said first and second reflecting or refracting means comprises partially-transmitting non-selective beam splitters.

5. An apparatus for reproducing transparent copy and improving photomechanical reproduction by contrast decrease, as set forth in claim 3, wherein said first and second reflecting or refracting means comprises totally reflective or refractive mirrors.

6. An apparatus for reproducing transparent color copy and improving photomechanical reproduction by contrast decrease, as set forth in claim 3, including:
   a. A first color filter interposed on the first optical axis after having the secondary positive video-image optically directed therefrom and before having said secondary negative video-image superimposed on the main positive video-image on the first video-imaging plane, and
   b. A second color filter interposed on the second optical axis after having the secondary positive video-image optically directed from the first optical axis and before having the secondary positive video-image optically directed onto the second imaging plane of the lens of the TV camera.

7. An apparatus for reproducing transparent color copy and improving photomechanical reproduction by contrast decrease, as set forth in claim 3, including a color filter interposed on the first optical axis between the light box and the color transparency copy.

* * * * *